United States Patent
Reynolds et al.

(10) Patent No.: US 9,495,542 B2
(45) Date of Patent: Nov. 15, 2016

(54) SOFTWARE INSPECTION SYSTEM

(71) Applicant: Trustees of Boston University, Boston, MA (US)

(72) Inventors: Mark C. Reynolds, Concord, MA (US); Azer Bestavros, Wayland, MA (US); Assaf J. Kfoury, Brookline, MA (US)

(73) Assignee: Trustees of Boston University, Boston, MA (US)

( * ) Notice: Subject to any disclaimer, the term of this patent is extended or adjusted under 35 U.S.C. 154(b) by 202 days.

(21) Appl. No.: 13/780,448

(22) Filed: Feb. 28, 2013

(65) Prior Publication Data

US 2014/0245440 A1    Aug. 28, 2014

(51) Int. Cl.
*G06F 21/56*    (2013.01)

(52) U.S. Cl.
CPC ................... *G06F 21/563* (2013.01)

(58) Field of Classification Search
CPC .. H04L 63/1416; G06F 21/56; G06F 21/563; G06F 21/566
USPC ............ 727/22, 23, 24; 726/22, 23, 24
See application file for complete search history.

(56) References Cited

U.S. PATENT DOCUMENTS

| | | | |
|---|---|---|---|
| 2006/0195830 A1* | 8/2006 | Smith ..................... | G06F 8/447 717/151 |
| 2008/0209567 A1 | 8/2008 | Lockhart et al. ............... | 726/25 |
| 2009/0089759 A1* | 4/2009 | Rajan ................. | G06F 11/3684 717/126 |
| 2009/0282477 A1 | 11/2009 | Chen et al. ..................... | 726/22 |
| 2010/0218253 A1 | 8/2010 | Sutton et al. .................... | 726/23 |
| 2011/0162070 A1 | 6/2011 | Krasser et al. .................. | 726/23 |

OTHER PUBLICATIONS

Reynold "Modeling the Java Bytecode Verifier", Science of Computer Programming, 00 (2010) 1-20, Elsevier.*
Anastasakis et al. "UML2Alloy: A Challenging Model Transformation", G. Engels et al. (Eds.): MoDELS 2007, LNCS 4735, pp. 436-450, 2007, Springer-Verlag Berlin Heideberg 2007.*
Klein et al. "Verified bycode verifier", Theoretical Computer Science 298 (2003) 583-626, 2002 Published by Elsevier Science B.V.*
Reynolds, Mark C., "Lightweight Modeling of Java Virtual Machine Security Constraints Using Alloy," in *ABZ'10 Proceedings of the Second International Conference on Abstract State Machines, Alloy, B and Z*, 14 pages, Dec. 30, 2008; http://www.cs.bu.edu/techreports/pdf/2008-031-jvm-alloy.pdf.

(Continued)

*Primary Examiner* — Tae Kim
*Assistant Examiner* — Shiuh-Huei Ku
(74) *Attorney, Agent, or Firm* — Sunstein Kann Murphy & Timbers LLP

(57) ABSTRACT

A method for software inspection analyzes a body of computer code to assess whether the body of computer code contains malware. Various embodiments extract the executable elements of the body of computer code and modify those elements using rules defining the format of instructions for the programming language in which the computer code was written, and using rules defined from the security specification of that programming language, to produce a model of the body of computer code. The method then analyzes the model using a model checking system, which determines whether any of the language rules have been violated, in which case the method flags the computer code as potentially including malware.

17 Claims, 8 Drawing Sheets

(56) References Cited

OTHER PUBLICATIONS

Reynolds, Mark C., "Using Lightweight Formal Methods for JavaScript Security," *Technical Report,* Computer Science Department, Boston University, 14 pages, May 3, 2010; http://www.cs.bu.edu/techreports/pdf/2010-021-lightweight-formal-javascript-security.pdf.

Reynolds, Mark C., "Modeling the Java Bytecode Verifier," Computer Science Department, Boston University, 13 pages, Dec. 2009, http://www.cs.bu.edu/techreports/pdf/2009-036-bytecode-verifier.pdf.

Reynolds, Mark C., "Modeling the Java Bytecode Verifier," Science of Computer Programming 00 (2010) 1-20.

Reynolds, Mark C., "Lightweight Modeling of Java Virtual Machine Security Constraints" 2010.

Haiping Xu, "Java Security Model and Bytecode Verification," Report EECS-12-99, EECS Department, University of Illinois at Chicago, Dec. 1999, 1-13.

Reynolds et al., "Formal Verification of Cross-Domain Access Control Policies Using Model Checking," Technical Report BUCS-TR-2011-031, CS Department, Boston University, 8 pages, Dec. 30, 2011.

Reynolds et al., "Programming Language Security," poster displayed for the Boston University Engineering day on Apr. 25, 2011, 1 page.

* cited by examiner $$seg(M) = \sum_{i=1}^{k} \frac{N^2(M_i)}{len^2(M_i)}$$

SOFTWARE INSPECTION SYSTEM

TECHNICAL FIELD

The present invention relates to software analysis, and more particularly to malware detection.

BACKGROUND ART

Typical anti-virus and intrusion detection techniques rely on one or two methods: pattern matching and anomaly detection, both of which have shortcomings.

In pattern matching, binary software is scanned to see if it provides a match against any of a number of binary patterns, known as "signatures." Because the patterns must be known, pattern matching cannot detect a previously-unknown item of malware unless the author of that malware included such a signature, for example by re-using a section of virus code from a previous virus. Further, pattern matching is easy to defeat by a process known as mutation. The malware author makes a series of alterations to his malware, and then tests it against the commercial products. Once a state is reached where the malicious software is still doing its malicious deeds, but is no longer caught by the virus scanners, the malware author can distribute the newly working mutated virus again. This is why signature-based products need to update their signatures so often: as new mutations are released, new patterns must also be released to detect them. For example, if a virus scanner is looking for a binary pattern like 0x2F5E . . . B00F, and the malware writer can produce a virus with a pattern that looks like 0x 2F5E . . . B00A, it won't be recognized, and the new pattern must be added to an updated signature file that every user must then download in order to be protected. It is not uncommon for virus to have dozens or even hundreds of variants. Clever malware writers can even automate the mutation process so that no human interaction is required.

In anomaly detection, an algorithm attempts to classify inputs using a "classifier" or "discriminator." The techniques used in anomaly detection are often very similar to those used in machine learning or image processing. The goal is to sort incoming network data into two bins, one that will be labeled "benign" while the other is labeled "suspicious."

There are at least two ways to defeat anomaly detectors. One approach is known as maladaptive training, in which an anomaly detector is flooded with benign but unusual data (for example, by taking a real virus, neutralizing it, and then mutating the neutralized version many times). If this unusual data represents a significant fraction of the total network data, the malware author can in cause the anomaly detector to adapt its algorithm, so that an item of malware that is similar to the benign data will be classified as benign.

Another way to defeat anomaly detectors is an approach called "low and slow." Anomaly detectors are typically looking at the network data associated with more than one host, so the amount of data they must handle is very large. As a result, anomaly detectors often have a "time window." Any data that is outside the time window by virtue of being too old is not used as input to the algorithm. If the malware author can partition his malware into chunks, and send each chunk slowly enough that at most a single chunk will be within the time window of the anomaly detector (which can be as small as 30 seconds), then the anomaly detector may not find the malware. This approach is "low" because every chunk looks benign, even though the combined block of binary code would look malicious. It is "slow" because of the way in which it evades the anomaly detector's correlation process. Of course, in order to use a low and slow attack the malware author must include some code to reassemble the chunks; this is often sent in the first chunk (or sometimes the last).

SUMMARY OF THE EMBODIMENTS

In a first embodiment of the invention there is provided a method of assessing software, and in particular a method of assessing software for the possible presence of malware. The method employs a model checker to scan an item of executable binary code that has been prepared from a computer program written in a programming language. The model checker is itself a computer program that executes on a host computer processor.

The method preparing a data structure corresponding to the item of executable binary code by parsing the executable binary code to extract executable elements; providing a language definition file corresponding to the programming language, the language definition file comprising rules defining the format of instructions in the programming language; providing a static model corresponding to the programming language, the static model comprising rules defined from the security specification of the programming language; creating a composite model of the executable binary code by supplementing the data structure with metadata including at least security rules defined by a specification of the programming language (e.g., information from the language definition file, and/or information from the static model), the composite model having a format for processing by the model checker; providing the composite model to the model checker; engaging the model checker to analyze the composite model to determine whether the model violates one or more rules defined by the programming language, the model checker producing a result; and generating an output based on the result produced by the model checker, the output including an indication of whether the model checker identified an indication that the binary code may contain malware.

In various embodiments, the model checker comprises a proof system or a constraint-based model checker. For example, the model checker may be the Alloy Analyzer, or Isabelle, to name but a few.

The step of creating a composite model of the executable binary code by supplementing the data structure with information from the language definition file and with information from the static model may include the steps of creating a dynamic model from the data structure by supplementing the data structure with information from the language definition file, the dynamic model having a format for processing by a model checking system; and supplementing the dynamic model with information from the static model.

Some embodiments also further prepare the model to be analyzed by segmenting the composite model into a plurality of segments, and analyzing each of the plurality segments individually; and analyzing the boundaries that define the segments.

In addition, the step of segmenting the composite model into a plurality of segments may include providing a tuning factor length, the tuning factor length representing a number of instructions in a segment; dividing the composite model into a plurality of initial, consecutive segments, including at least a first segment, each segment having a length not greater than the tuning factor length; and changing a distribution of instructions among the segments by, for each segment after the first segment, assessing at least the first instruction in each segment, and moving the at least first instruction to an immediately preceding segment if that at least first instruction is not a transfer instruction, and if moving the at least first instruction would not cause the length of the immediately preceding segment to exceed the tuning factor length.

In other embodiments, the step of segmenting the composite model into a plurality of segments may include segmenting the composite model by language rule.

In general, a step of analyzing each of the plurality of segments individually may include analyzing each of the segments in parallel using a plurality of model checking systems.

In another embodiment, a non-transient computer program product includes computer code for execution on a host computer processor. The computer code is for implementing a method of scanning an item of target code prepared from a program written in a programming language, by employing a model checking system. Such computer code includes: computer code for receiving the item of target code, the target code comprising an item of executable binary code; code for preparing a data structure corresponding to the item target code by parsing the target code to extract identify executable elements; code for providing a language definition file corresponding to the programming language, the language definition file comprising rules defining the format of instructions in the programming language; code for providing a static model corresponding to the programming language, the static model comprising rules defined from the security specification of the programming language; code for creating a composite model of the target code by supplementing the data structure with information from the language definition file, and with information from the static model, the composite model having a format for processing by the model checking system; code for providing the composite model to the model checker; and code for engaging the model checker to analyze the composite model, the model checker producing a result; code for generating an output based on the result produced by the model checker, the output indicating a measure of whether the model checker identified an indication that the target contains malware.

The computer code may also include code for segmenting the composite model into a plurality of segments; and code for engaging the model checker that includes code for analyzing each of the plurality segments individually; and code for analyzing the boundaries of the segments.

In some embodiments, the code for segmenting the composite model into a plurality of segments includes code for providing a tuning factor length, the tuning factor length representing a number of instructions in a segment; code for dividing the composite model into a plurality of initial, consecutive segments, including at least a first segment, each segment having a length not greater than the tuning factor length; and code for changing a distribution of instructions among the segments by, for each segment after the first segment, assessing at least the first instruction in each segment, and moving the at least first instruction to an immediately preceding segment if that at least first instruction is not a transfer instruction, and if moving the at least first instruction would not cause the length of the immediately preceding segment to exceed the tuning factor length.

Alternately, the code for segmenting the composite model into a plurality of segments may include code for segmenting the composite model into a plurality of segments according to language rule, and code for providing the composite model to the model checker includes code for providing the plurality of segments to a plurality of model checking systems.

In another embodiment, a system for scanning an item of executable binary code (which executable binary code is prepared from a program written in a programming language) employs a model checker. Such a system includes a receiving module for receiving an item of executable binary code; a parsing module for preparing a data structure corresponding to the item of executable binary code by parsing the executable binary code to extract identify executable elements; a language metadata module for providing a language definition file corresponding to the programming language, the language definition file comprising rules defining the format of instructions in the programming language, and for providing a static model corresponding to the programming language, the static model comprising rules defined from the security specification of the programming language; a composite module for creating a composite model of the executable binary code by supplementing the data structure with information from the language definition file, and with information from the static model, the composite model having a format for processing by a model checker; and a model checker configured to analyze the composite model according to the rules defining the format of instructions in the programming language, and/or the rules defined from the security specification of the programming language, and to produce a result, the result comprising an indication that the binary code contains malware.

The system may also include a segmentation module for segmenting the composite model into a plurality of segments. Also, the system may include a plurality of model checkers for individually analyzing the plurality of segments.

For example, a segmentation module may be configured to divide the composite model into a plurality of initial, consecutive segments, including at least a first segment, each segment having a length not greater than a tuning factor length; and change a distribution of instructions among the segments by, for each segment after the first segment, assessing at least the first instruction in each segment, and moving the at least first instruction to an immediately preceding segment if that at least first instruction is not a transfer instruction, and if moving the at least first instruction would not cause the length of the immediately preceding segment to exceed the tuning factor length.

Some systems also include a library module for storing a plurality of previously analyzed segments, and the analysis module is configured to access one or more of the previously analyzed segments instead of performing a new analysis of a one of the plurality of segments.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Various methods disclosed below analyze an item of software to assess whether that item of software might include malware. The method does not require that the malware be previously-known, and indeed the model is capable of identifying even so-called "zero day" malware. Further, the method produces no false-positives (i.e., it will not incorrectly indicate the presence of malware), and may be performed to achieve an arbitrarily small false-negative rate.

Variations on the method may be implemented to moderate the time required for performing the method, and/or the thoroughness of the method. Indeed, some embodiments put aspects of the method under user control.

Various embodiments include a model checker, or the use of a model checker. Generally, model checkers are a class of tools that analyze a model of a system to determine whether the system meets, or violates, a given specification. As known by those skilled in the art of constraint-based analysis, some model checkers may be described as "constraint-based" model checkers, in that they analyze a model of a system to determine whether the model violates one or more constraints established for the system being modeled. Some constraints on a model may be described as "static," meaning that they do not change dependent on the system being modeled for analysis by a model checker. Other constraints may described as "dynamic" in that they will be different for different systems being modeled for analysis by a model checker.

As used herein, and in any appended claims, the term "model checker" includes, without limitations, model checkers implemented in software, hardware, or a combination of software and hardware. In particular, as used herein, and in any appended claims, a model checker is a tool that assesses a given item of code (which may be known as "target code" or "software under test", for example) to determine whether the code violates one or more rules established for that code (e.g., constraints). Two such model checkers are the Alloy Analyzer and the Isabelle theorem prover, just to name a few examples. However, embodiments are not limited to those two particular tools.

The inputs to a model checker include a representation of the target code, and the rules against which the target code is to be assessed. Therefore, various embodiments include the preparation of those inputs, and engaging a model checker to analyze the inputs and provide an output.

An overview of a method of analyzing an item of target code to assess whether it might include malware in presented below in connection with FIG. 1, and aspects of various embodiments are discussed in more detail below. Additional disclosure and detail is provided below, and in the Thesis of Mark Reynolds, Ph.D, the complete content of which is a part of this application as Appendix E.

Overview

Figure 1:
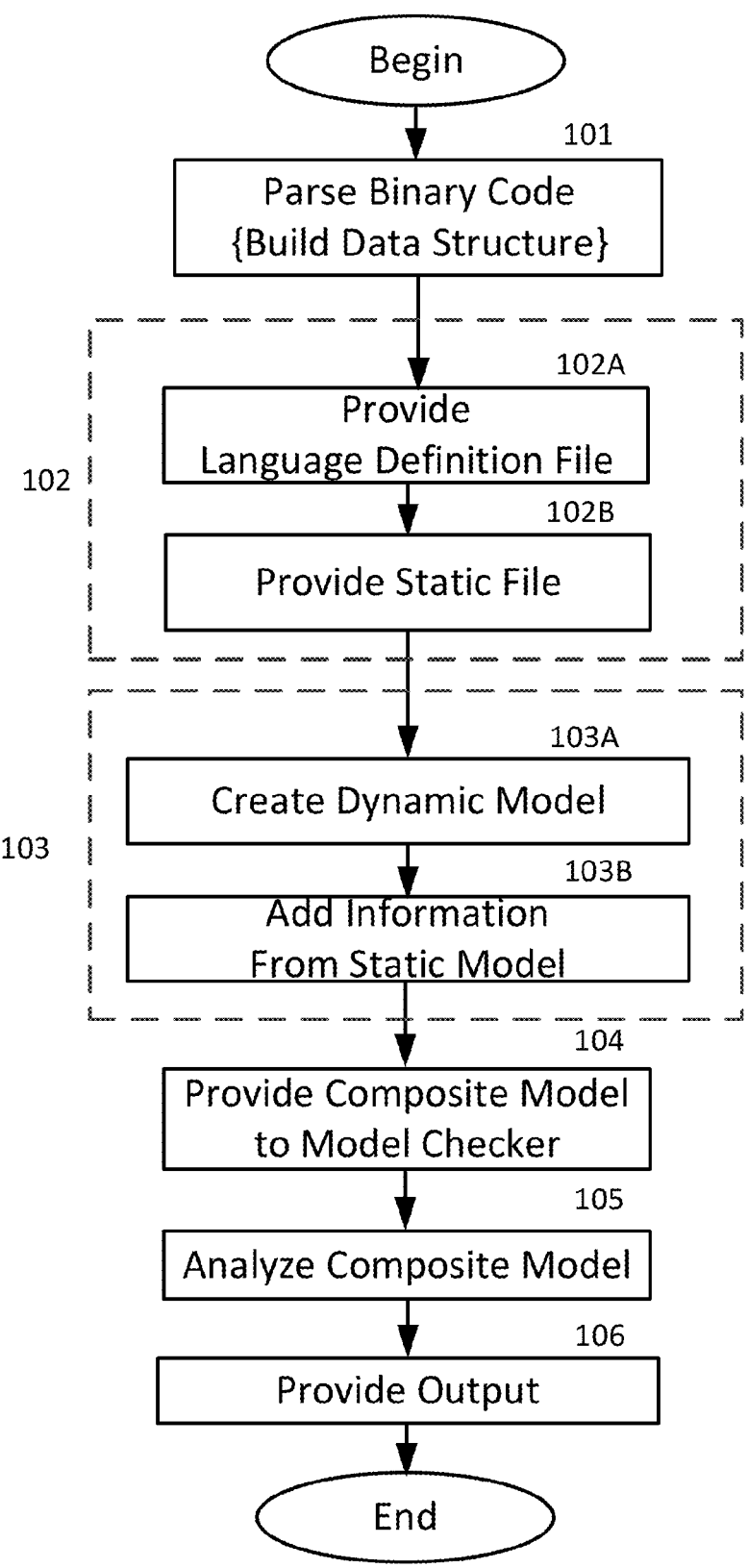
FIG. 1 is a flow chart that schematically illustrates an illustrative method of assessing an item of target binary code.
Figure 2:
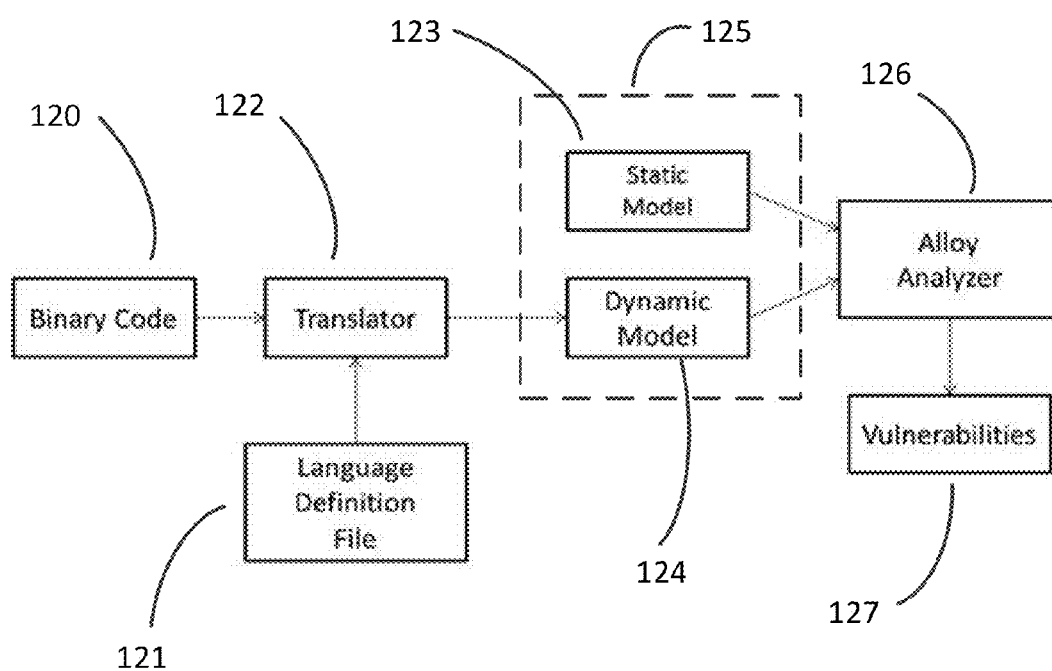
FIG. 2 schematically illustrates certain input files, output files, and components of a software inspection system.

In an illustrative embodiment of a method of assessing an item of software (the target code) is schematically illustrated in FIG. 1, and illustrative component parts and files are schematically illustrated in FIG. 2. The method 100 parses an item of target code (binary code 120) to extract those elements for which the target code's programming language specifies various formats and security rules (step 101). For example, the method may extract from the target code the instructions used in the target code, as well as instruction operands, symbol table contents, function/method/procedure calls, etc. Step 101 produces the extracted elements in a data structure.

At step 102, the method 100 provides one or more files, or information, relating to various rules that define the programming language in which the target code was written. In some embodiments, proving such files or information may be viewed as separate steps—step 102A provides a file (e.g., a language definition file, 121) containing rules defining the format of instructions for the programming language in which the item of software was written, and step 102B provides a file containing security rules (e.g., a static model, 123) defined from the security specification of that programming language.

The data structure produced at step 101, and information (e.g., instruction rules) from the language definition file 121, and information (e.g., security rules) from the static model 123 are combined to form a composite model at step 103. The instruction rules and the security rules may be considered to be metadata, in that they are rules that may be applied in the analysis of the target code, and such rules may be referred-to collectively as "rules." In some embodiments, the actions are performed in a two-step process—first combining the data structure with information from the language definition file to produce a dynamic model 124 (step 103A), and then combining information from the static model with the dynamic model (step 103B) to yield the composite model 125 (step 103).

The composite model is provided to a model checker 126 at step 104. In FIG. 2, the model checker is identified as the Alloy Analyzer.

The model checker 126 analyzes the model at step 105 to determine whether the item of software, or a subset of the item of software, violates any of the above-mentioned rules. Such a rule violation is often indicative of malware, so the identification of a rule violation may be used to flag the item of software as containing, or potentially containing, malware.

The model checker 126 thus produces an output 127 at step 106. The output 127 is an indication of whether the model checker found a violation any of the rules defined for its programming language, and may be in indication of whether the binary code is, or contains, malware. For example, in some embodiments, the output may be a text-based indication to a user, such as "Analysis indicates that the tested code violates a programming language rule and may include malware." Alternately, in some embodiments, the output 127 may affirmatively indicate that the target code does not violate any such rules. The nature of the output will depend on the specific model checker 126 used, and the parameters of the analysis for which the model checker 126 was engaged.

Various embodiments may be used for a variety of programming languages, from code written in a microprocessor's machine language, an assembly language, any defined higher-level programming language, and even virtual machine language such as Java and Flash, to name but a few examples. Other target languages may include, without limitation, Android (Dalvik virtual machine code), Microsoft .NET (Common Language Runtime (CLR) virtual machine code), ARM machine code, JavaScript, and Intel machine code.

Example embodiments described below use a Java file as an example, but the inventions herein are not limited to Java files, and are not limited to programs for virtual machines. To illustrate that example, various appendices provide examples of files used in, and created by, the example method.

Parser

An item of target code (e.g., the software to be analyzed, which may also be known as the "binary code") may be in an executable binary code format. For example, the target code may be in machine language, or may be compiled (i.e., post-compiler) code that was written in some higher-level programming language. Such code may be described as "compiled," essentially able to execute on a processor without further preparation; in the format in which its author intended it to be executable. Such code is difficult for a human to read, and may not be in a format suitable for analysis by a model checking system. As such, various embodiments begin by receiving an item of target code (e.g., an executable binary code) and reformatting it.

A parser receives, as input, a binary code and parses the binary code to extract its executable elements. For example, the executable elements may include the instructions used, instruction operands, symbol table contents, function/method/procedure calls, to name but a few examples.

The executable elements of an item of binary code will vary with a variety of factors, such as the content of the specific item of an binary code, the programming language in which it was written, and in the case of a program written in a higher level language, the compiler used to compile it, to name but a few. In some embodiments, the executable elements may those elements of executable code for which the programming language in which the code was written includes a specification of at least instruction format, or security rules, for example.

Alternately, the parser may be said to discard non-executable elements, such as headers or other data within the program file that is not necessary for analysis by a model checker.

The parser parses the binary code using language-dependent rules. Thus, if the binary code is written using the instruction set of the Java Virtual Machine (JVM), the translator will parse the Binary Code according to the rules which define the format of a JVM file. Alternately, if the Binary Code is a Flash™ file containing ActionScript, the translator will parse the binary code according to the rules that define the format of a Flash file containing ActionScript. As a result of this parsing the Translator will develop an internal representation of the contents of the binary code file, including the executable elements (e.g., information such as instructions used, instruction operands, symbol table contents, and function/method/procedure calls). This representation will be specific to the binary code that is input to the parser.

The output of the parser is a data structure, which may take the form of a data file. The data structure represents an internal representation of the binary code.

Translator

After the binary code has been parsed, a translator uses the parsed code to produce a dynamic model of the binary code.

The translator also uses as input a file known as the language definition file (LDF). The language definition file contains detailed rules which describe the format of each instruction of the language in which the binary code is written. For example, the language definition file includes information about rules that specify the data types consumed and produced by each instruction in that instruction set. As such, the language definition file depends on the language in which the binary code is written, but not on the contents of the binary code file itself. Thus, there is one language definition file for the Java virtual machine ("JVM"), a separate language definition file for Flash, and so forth. Similarly, the machine code for a hardware processor, and most higher-level programming languages, will have specifications for the instruction in their instruction set, and a separate language definition file for each such language may be prepared and used. In keeping with the illustrative Java example, an example of a language definition file for Java is provided in Appendix A. An example of a dynamic model for the illustrative Java binary code is provided in Appendix B.

The translator combines the parsed representation of the binary code with the instruction set information that it gleans from the language definition file, and then produces as output a formal model of the binary code. This model, known as the dynamic model, is written or formatted by the translator in a format configured for processing by a model checker. For example, if the model checker is the Alloy Analyzer, the translator will format the dynamic model in the Alloy modeling language. Alternately, if the model checker is another modeling language, such as Isabelle/HOL for example, the translator will format the Dynamic model in accordance with the requirement of that other model checker.

Generally, the dynamic model is not a complete model, since a complete model will, in some embodiments, also contain information about the security rules of the programming language in which the binary code was written. Such rules are provided in the form of a static model, as discussed below.

Static Model

Generally, a programming language will have a security specification. The static model contains all the rules derived from the security specification of the language. The security specification, in turn, is derived from vendor documentation (e.g. the JVM specification from Oracle, the Flash and ActionScript specifications from Adobe, and so forth).

As such, there is one static model for each programming language, and that static model depends on the language in which the binary code is written, not on the actual contents of the binary code itself.

An example of a static model for Java is provided in Appendix C.

Composite Model

A model checker takes, as input, a model of a system, and checks whether this model meets a given specification. As applied to an item of binary code, the input to a model check generally includes both a representation of the binary code, along with the rules defined by its programming language.

To this end, various embodiments prepare a file that is a concatenation of the dynamic model and the static model. That file may be known as a composite model (or a "complete" model, or a "concatenated" model).

For example, if the model checker is the Alloy Analyzer, the composite model includes the parsed representation of the code, and the associate rules supplied by the translator from the language definition file, along with the rules from the static model. An example of a composite model for the example binary code is provided in Appendix D.

Model Checker

As applied to binary code, a model checker is a system that analyzes a model to assess whether the model violates one or more rules established for the programming language in which the binary code was written. A model checker may be implemented in software configured for execution on computer hardware, or in hardware, or in a combination of hardware and software.

Many forms of malware exploit weaknesses in programming languages by, for example, causing the computer running the malware to deviate from its normal operation. Such exploitation may be characterized by the violation, by the binary code (i.e., the malware), of one of the rules described above. As such, if an item of binary code is found to violate one or more such rules, that finding may be an indication that the binary code is, or contains, malware.

The discovery of such a violation may be used to flag the binary code as suspicious, so that a user or system may take action to avoid the exploitation intended by the binary code, for example by prevent the code from executing, or alerting a user to take protective measures.

Taking the Alloy Analyzer as an example, when the Alloy Analyzer is run, one of two outputs will be produced. Either the Alloy Analyzer will produce one or more counterexamples to the rules specified in the static model, or the Analyzer will declare that there are no counterexamples. A counter example, in the Alloy Analyzer, is an indication that the target code fails to meet one of more of the specification—e.g., the target code violates one or more of the rules. In the former case, one of the security rules has been violated, so the software should be regarded with suspicion. The Alloy Analyzer output is sufficiently detailed that in the case of a counterexample a straightforward process may be used to derive a detailed description of which rule was violated and how it was violated. In the latter case, where no counterexample is found, the output of the Alloy Analyzer means that either the software is not malicious, or that the Analyzer has failed to find a counterexample (i.e., the output is a "false negative").

The inventor has discovered that the detection of a rule violation may be useful in detecting previously unknown malware (e.g., "zero day" code), since the analysis does not rely on recognition of a signature of a previously identified item of malware. Further, the method never produces a false-positive, since it only reacts to the violation of defined rules.

Optimization

Depending on the size of the binary code to be analyzed, and the depth to which it is to be analyzed, the method could consume a substantial amount of time. For example, some items of binary code could take several hours, from parsing to the output of the model checker. As such, the method may be modified or optimized according to a variety of techniques, as described below. The inventor has observed, in some instances, a reduction in analysis time from several hours, down to several minutes, although the benefit of any optimization will depend, among other things on the target code and other parameters of the analysis.

1. Rule-Based Segmentation

One approach to optimizing the method is to parse or segment the composite model by the various rules. Generally, the rules of the static model are independent from one another. Thus, rule-based segmentation uses multiple processing components (e.g., model checkers) for each rule or groups of rules. Indeed, some embodiments even assign or provide a processing component to each rule. As such, the analysis of the various segments may be performed independently, and in some embodiments, may be done simultaneously, or in parallel. For example, such an approach provides for automatic parallelism in the Alloy Analyzer.

2. Decomposition-Based Segmentation

Figure 3:
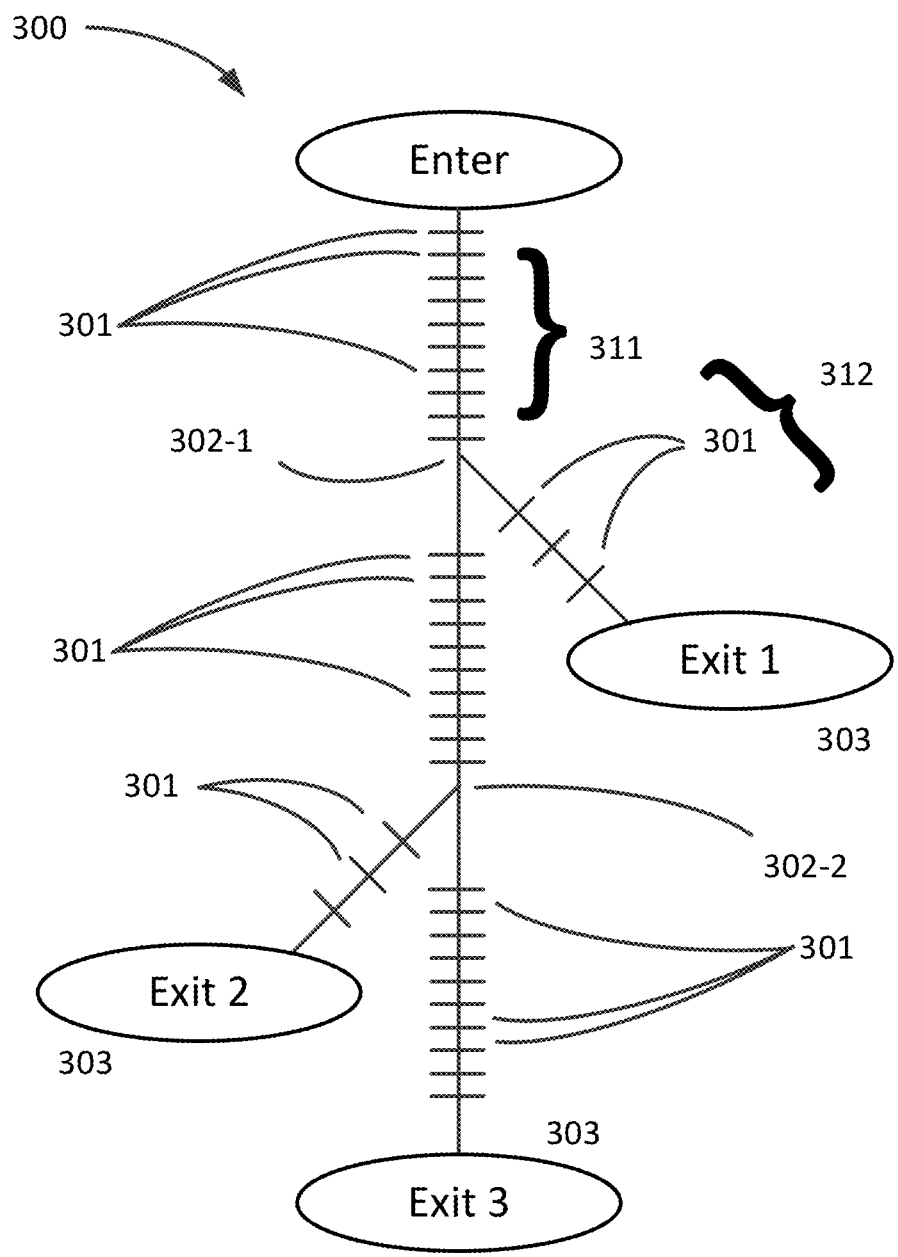
FIG. 3 schematically illustrates an item of target binary code.

Another approach includes decomposing the Composite model into smaller portions, for example of sequential lines of the target code. For example, as schematically illustrated in FIG. 3, an item of target code 300 may include a number of instructions 301. Further, the execution path of the target code may include a number of branches (302-1, 302-2) and exit points (303). Of course, the target code 300 is merely illustrative, and other items of target code may be much larger and much more complex, and may include any of the wide variety of known programming structures.

In some embodiments, the composite model may include the target code in its entirety, and the model checker may analyze the composite model in its entirety. However, in some embodiments, in may not be necessary or desirable to take that approach. Therefore, in some embodiments, the composite model may be broken-down into smaller segments, and analyzing one or more of the segments.

For example, a composite model can be decomposed into smaller models by partitioning the instruction information in the composite model, while copying all other information. These partitions may then be known as the "segments" of the composite model. In the target code 300 of FIG. 3 for example, a first segment 311 might include the instructions and other portions of the composite model from the beginning up to the first branch 302. A second segment might include the portions of the composite model from the first branch 302 to the exit point 303. Other segments might include the portions of the composite model between other points of the execution bath and its branches.

The segments can be processed in independently, and even in parallel (e.g., simultaneously), because each now represents an independent complete model. This segmentation process thus provides an additional way of automatic parallelism for the analysis process.

An example of a segmented process 400 is schematically illustrated in FIG. 4. In some embodiments, a process may receive analysis parameters (e.g., as a form of user input for example) to define the method and/or the analysis (step 499). For example, analysis parameter may include parameters of the intended segmentation, or parameters defining the analysis flow (e.g., in parallel; in series), or parameters to define other aspects of the various embodiments described herein.

At a first step 401, the composite model is segmented into two or more segments. The composite model may be segmented in any way desired by the system or the user. At step 402, some or all of the segments and analyzed individually. In some embodiments, the segments may be analyzed serially (for example, by a single model checker), while in other embodiments the segments may be analyzed simultaneously, or in parallel (for example, by a number of model checkers, each analyzing one or more of the segments).

At step 403, the method provides the results of the analysis, according to any of the embodiments described herein. The output may take a variety of forms, such as a text-based output to a computer screen or file, or a response by the model checker to an item of software that called or controls the model checker, to name but a few examples. Substantively, the results provided at step 403 may be an alert to flag a user, or a computer, to indicate that the test code violates at least one rule. In some embodiments, the output may also include details about what rule or rules are violated by the target code, and/or what instructions caused or are associate with such a rule violation by the target code.

In some embodiments, some portions of a segment may not be analyzed along with the remainder of the segment. Also, some embodiments assess on or more portions of a composite model after the segments have been analyzed. Examples of situations that might employ such methods are described below.

Some computer instructions cause a transfer of control, or program flow, within a program. Most instructions are executed in sequence. For example, when a first instruction ("N") executes, the computer's program counter simply advances to the next instruction ("N+1") in a sequential series of instructions.

Transfer of control instructions, however, may cause a jump to any other place in the current code, such that the next instruction executed is not the instruction in the series. As such, transfer of control instructions (for example) may suggest various approaches to segmented analysis of a composite model.

As an example, consider a composite model M that includes "transfer of control" instruction, such as an instruction that causes the program sequence to jump from one portion of the code to a jump-to instruction in another portion of the code. If the model M is segmented into ten segments (M1-M10), it is possible that the jump instruction might be in segment M3, and the jump-to instruction might be in segment M6.

If a model checker analyzes the entire model M without segmentation it can determine whether or not the jump instruction violates any of the defined rules against which the model M is being checked. However, if the model checker analyzes segment M3 in isolation, it may not be possible to determine whether that jump instruction violates one of the defined rules.

As such, to assess the jump instruction, a method may analyze the entire model M in a non-segmented fashion, thus obviating the benefit of segmentation. Similar issues may arise with regard to instructions that fall at the end of a segment of a composite model, for example if the rules that pertain to such an instruction cannot be analyzed while isolated from one or more ensuing instructions.

To address such situations, some embodiments perform a partial analysis (or "sub-analysis") of the entire model M. For example, a sub-analysis may be limited to instructions of a given type (e.g., transfer of control instructions), or instructions having a given rule, or instructions that fall at the end (or boundary) of a segment.

Figure 4A:
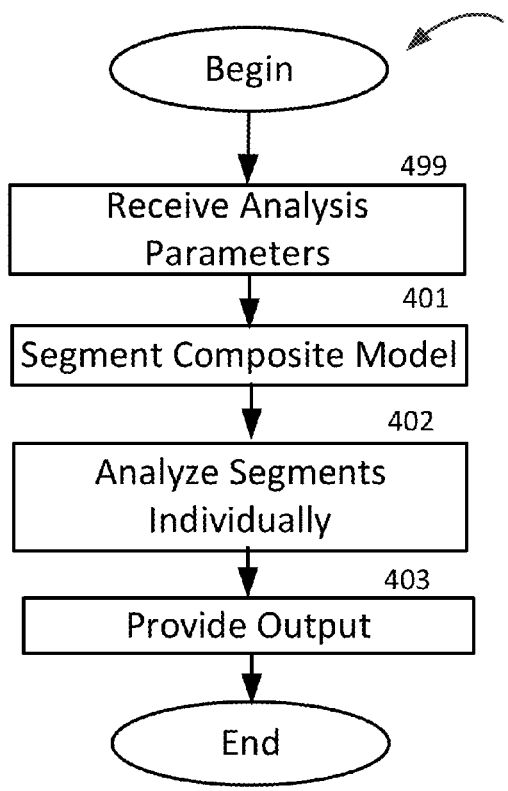
FIGS. 4A-4C are flow charts that schematically illustrate embodiments of segmentation flow processes.
Figure 4B:
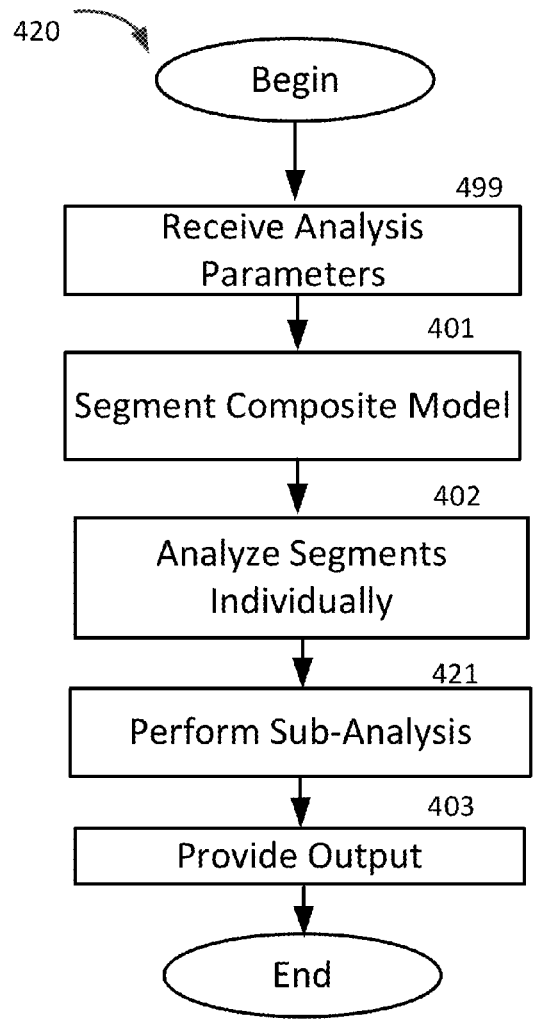

Such a partial analysis may be performed before, after, or in parallel with, the analysis of one or more of the segments, as schematically illustrated by step 421 of the method 420 illustrated in FIG. 4B. Taking the method illustrated by FIG. 4B for example, the flow shows the sub-analysis 421 as occurring after the analysis of the individual segments, but the order could be different. In other words, the sub-analysis 421 could be performed before the analysis of the individual segments 402, or even in parallel with the analysis of the individual segments 402.

A sub-analysis may be performed by establishing new segments, e.g., boundary segments that include instructions at or near the end of one segment (Mi) and the beginning of a successive segment (Mi+1). In this way, the analysis may be performed for instructions that could not be analyzed in isolation from succeeding instructions that fall within a succeeding segment. Alternately, the entire model (M) could be analyzed, but limited to checking instructions at or near such a boundary.

In addition, the parameters of a segment analysis and any sub-analysis may be limited. For example, an analysis of one or more segments may be limited to rules and/or instructions other than those that can be analyze in a sub-analysis, so as to avoid duplication of effort. Alternately, or in addition, a sub-analysis 421 of the entire model M may be limited to assessing only specified types of instructions or rules (e.g., in keeping with the foregoing example: transfer of control rules and/or transfer of control instructions). If such a sub-analysis 421 detects any rule violations, then the analysis of the target code may be terminated, and any remaining analysis avoided.

Also, if any rule violation is identified in any portion of an analysis, whether during analysis of a segment in a sub-analysis, the remaining analysis may be terminated or avoided, since the target code has already been determined to violate a rule.

Figure 4C:
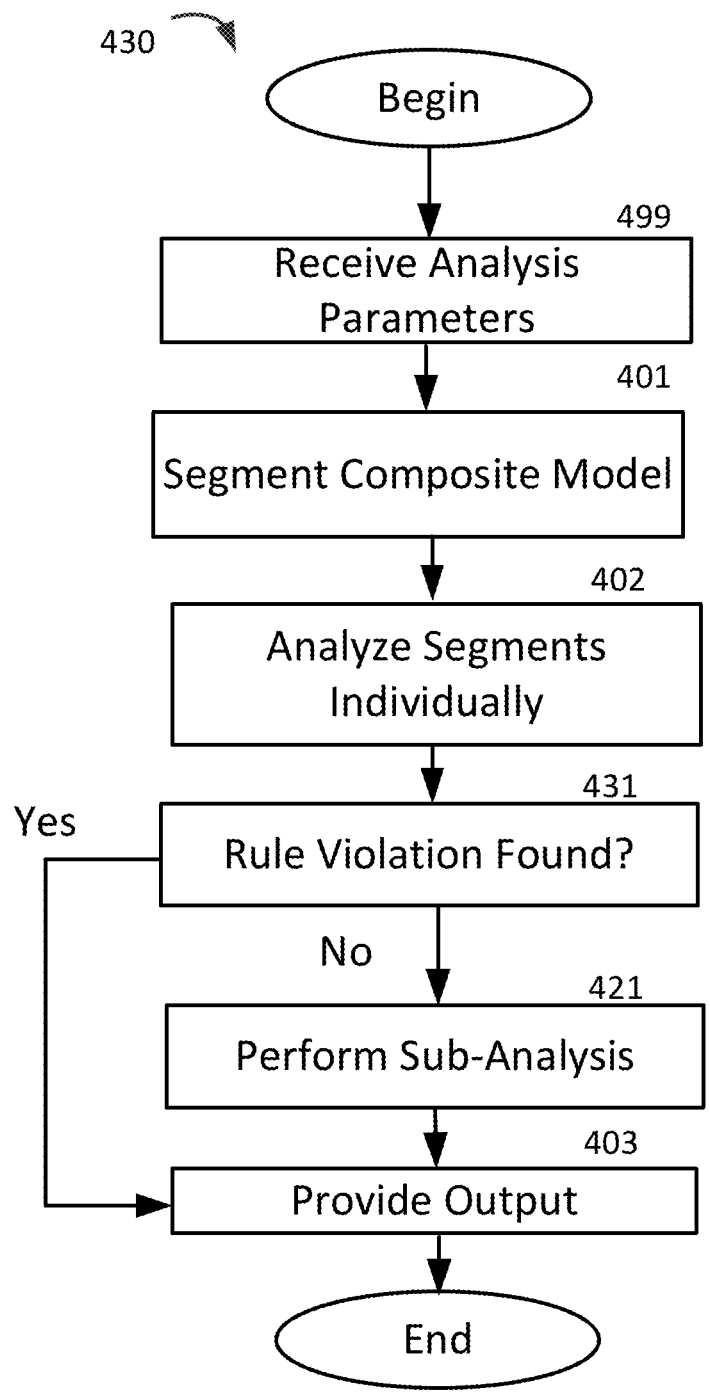

A more specific example of a method 430 for assessing an item of target code that includes a transfer of control instruction is presented in the flow chart of FIG. 4C, and proceeds as follows:

Step 499: Receive parameters of the analysis, such as parameters defining segmentation; information identifying rules and/or instructions to be analyzed in a sub-analysis; instructions on whether to terminate the analysis if a rule violation is identified, etc.;

Step 401: Segment target code into segments;

Step 402: Analyze each segment separately (and in parallel) against all rules in the static model, except those rules associated with transfers of control;

Step 431: If any segment reveals a violation of a security rule, then terminate analysis and provide output (e.g., step 403); otherwise proceed to step 421;

Step 421: Perform sub-analysis limited to rules that are related to transfer of control; and Step 403: Provide output.

Segments may be determined in a variety of ways. For example, some segments may be defined merely as a number of instructions from a composite model (e.g., segment 1=instructions 1-20; segment 2=instructions 21-40, etc.). Alternately, an item of target code may be segmented by features of the code. For example, a first segment may be defined as beginning with the first instruction in a composite model, and ending with the first branch instruction, and the second segment may include some or all of the instructions in a branch or subroutine, etc.

Some embodiments may employ a metric in the determination of segment boundaries. For example, consider a composite model "M" produced from an item of target code having a length (i.e., number of instructions) len(M), and in which some of the instructions are transfer-of-control instructions. Transfer-of-control instructions may be categorized as being "local" (i.e., the execution flow jumps to another instruction that is also within the same segment as transfer-of-control instruction) or "non-local" (i.e., the execution flow jumps to another instruction that is not within the same segment as the transfer-of-control instruction).

If the model M is segmented into two or more segments (M1-Mk), each segment (Mi) will have a first instruction (Fi) and a last instruction (Li). If Li is the last instruction of segment Mi, and instruction Fi+1 is the first instruction in segment Mi+1, then it is possible that during ordinary execution of the target code, instruction Fi+1 would be executed next after the execution of instruction Li. As such, for purposes of an analysis, that sequence of execution is similar to a non-local transfer-of-control, e.g., a jump from segment Mi to segment Mi+1.

Figure 4D:
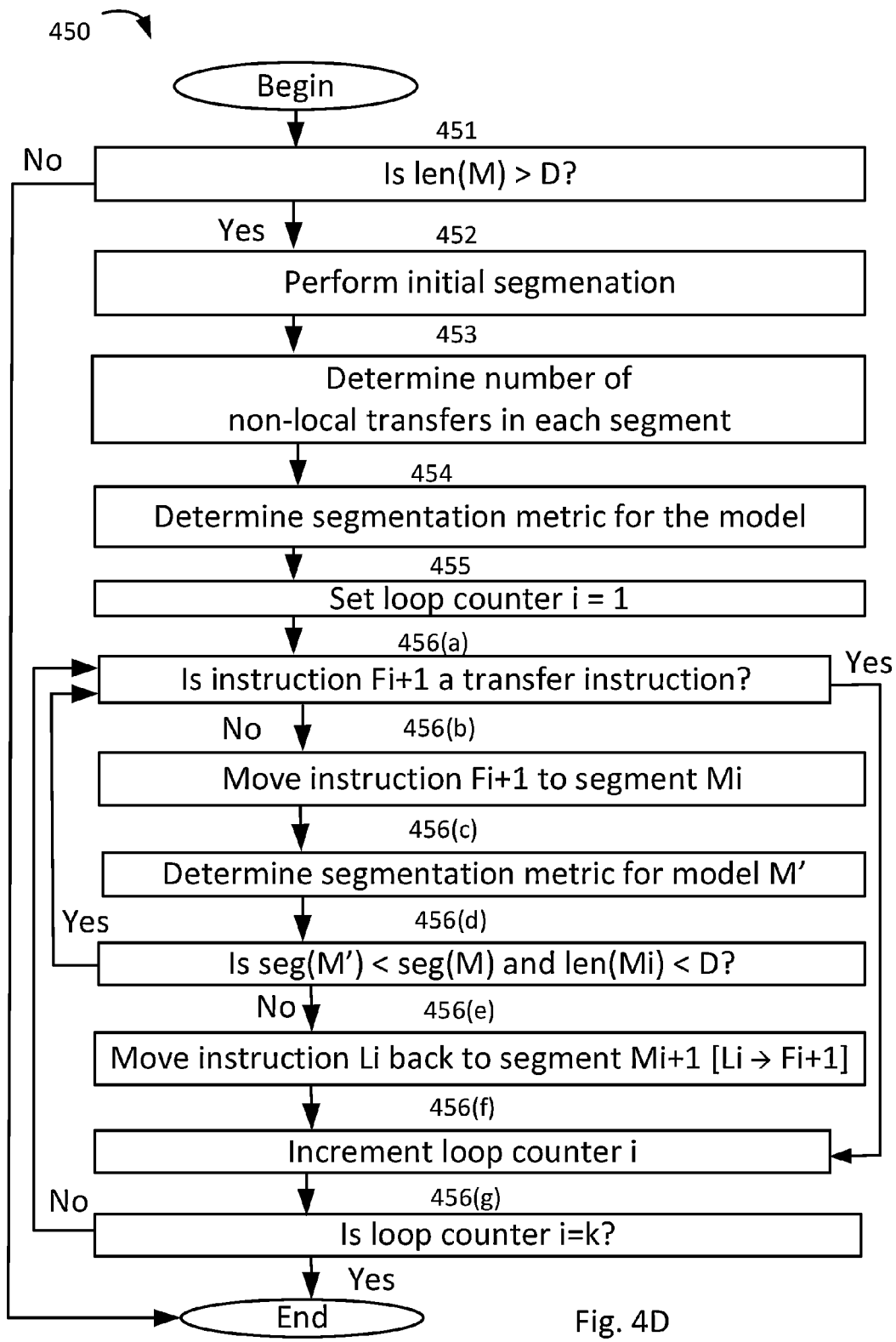
FIG. 4D is a flow chart that schematically illustrates a method of segmenting code.

A method 450 of segmenting the model M having len(M) is illustrated by a flow chart in FIG. 4D, and may proceed as follows. Here, len(M) is the number of instructions in the binary code (target code) on which the model M is based.

In this process 450, a variable ("D") is known as a "tuning factor," and is a parameter of the analysis, and is defined as the maximum number of instructions desired for, or allowed in, a given segment. The tuning factor D may depend on a number of factors, such as the time allotted for analysis of a given segment, or the amount of model checker resources available, to name but a few.

For example, in some embodiments, the tuning factor D may be specified as the largest model for which a single rule can be checked in five (5) minutes. For a typical office computer as of 2012, D may be 12, and for a server-class computer, D may be 18. The tuning factor D may increase with computing power. In any event, the tuning factor D serves as a parameter for segmenting a model.

Continuing with process 450, the method first determines whether the length of the model (len(M)) is greater than the tuning factor (D), at step 451. If not, the segmentation is not performed. Otherwise, the model M is initially segmented into a number of segments (M1-Mk) at step 452. In other words, the model M is initially segmented into k segments. Each segment may be described as having a length len(Mi). The initial segmentation at step 452 may be performed by any desired method, such as any of the approaches described above. In some embodiments, each segment initially has a length of 0.5D (i.e., D/2), although the segments could have other lengths, such as 0.45D, 0.55D. For the example illustrated by the flow chart in FIG. 4D, the initial number of segments will be k.

At step 453, the process determines, for each segment Mi, the number of non-local transfers within that segment. For each segment Mi, that number may be referred to as N(Mi).

Next, a segmentation metric is calculated for the entire composite model [step 454]. The segmentation metric is defined as:

$$seg(M) = \sum_{i=1}^{k} \frac{N^2(M_i)}{len^2(M_i)}$$

Subsequently, the method loops to assess the segments. To establish the loop, a loop counter (i) is set to 1 at step 455.

Starting with Mi with (i.e., i=1), the method considers the first instruction (Fi+1) in the succeeding segment (Mi+1) at step 456(a). If that instruction (Fi=1) is not a transfer instruction (i.e., is not a local transfer instruction or non-local transfer instruction), then the method moves the instruction (Fi+1) from segment Mi+1 to segment Mi [step 456(b)], such that the instruction (Fi+1) becomes the last instruction of segment Mi (i.e., it is no longer the first instruction in segment Mi+1, but is the last instruction in segment Mi; in other words, it becomes instruction Li). Other data in the composite file that is associated with instruction (e.g., metadata) is moved along with the instruction. As such, the updated segment Mi may be known as segment Mi'. The moving of an instruction from one segment to another as described above may result in a change to the segmentation metric, given that the length of the segment [len(Mi)] is a factor in the formula for seg(M). As such, the segmentation model calculated previously may be outdated, and the model M may now be known as model M' for purposes of re-calculating the segmentation metric.

The method 450 then determines (e.g., re-calculates) the segmentation metric [seg(M)] for the updated model M' [i.e., seg(M')] at step 456(c). This requires re-determining the number of non-local transfers in each segment, such that step 456(c) is similar to the combination of steps 453 and 454.

At step 456(d), the method determines whether seg(M') is <seg(M). If so, then the method repeats step 456(a) if len(Mi')<D. Otherwise, the method 450 moves the instruction (Li) back to segment Mi+1 [step 456(e)] (along with any other data that was moved with the instruction at step 456(b). In other words, that instruction that was instruction Fi+1, and then became instruction Li, moves back and takes its place as instruction Fi+1 again.

The method 450 then proceeds to step 456(f), and increments the loop counter (i). The method 450 will also jump to 456(f), and increment the loop counter (i), if instruction Fi+1 was determined to be a transfer function at step 456(a).

At step 456(g), the method 450 determines whether the loop counter has reached the number of initial segments (i.e., in this example, whether the loop counter has reached "k"). If so, a subsequent pass through the loop would be meaningless, since there would not be a next segment for which a first instruction could be assessed. In other words, there is no segment Mk+1, since there are only k segments to begin with, meaning that there would be no instruction Fk+1 to assess at step 456(a). In that case, the method 450 ends. Otherwise, the method 450 returns to the beginning of the loop at step 456(a).

3. Cached Segments

Once an item of binary code, or a segment of an item of binary code, has been analyzed, the results of that analysis (and indeed, the dynamic model of that binary code, and/or other parameters of such analysis, such as analysis depth as described below) may be saved in a library for future reference. In the event that the item of code is later presented for analysis, the method my simply recall the results of the previous analysis, instead of perform the method again. In short, if a model checker has already been applied to a model, or to the segments of a model (even if that model is from a different item of target code), the analysis results may be stored in a cache. If the model checker is asked to perform an analysis on a model or segment that has already been analyzed, the pre-computed result is fetched from the cache instead of being recomputed.

4. Depth Specification

Another approach is to limit the depth of the analysis performed by the model checker. Depending on the degree of certainty required by a given application of the method, it may not be necessary to analyze the target code (i.e., the composite model) in its entirety. Analyzing the composite model in its entirety will provide a high degree of confidence that the result is not a false negative. Analyzing less than the entirety of the composite model can produce an arbitrarily small false-negative rate, depending on the amount of the composite model analyzed. To that end, some embodiments may allow a user to specify the amount of the composite model to be analyzed.

Using the Alloy Analyzer as an example, the Alloy Analyzer only analyzes finite models, so the method must specify a depth (which may be known as a "search depth") for analysis. For example, the search depth may be specified as a certain number of instructions, starting from the beginning of the composite model.

If the search depth is insufficient, counterexamples may not be found because they are outside the search depth. It is possible to increase the search depth, and produce greater confidence in the result, at the cost of increased analysis time and more processing resources required. In addition, there is a beneficial interaction between the search depth and segmentation. If the search depth is insufficient to completely analyze a given model, it may be sufficient to analyze one or more of the segments of that model, based on the sizes of the various segments. Segmentation, as described above, may thus be applied not only to improve performance, but also to increase the functional scope of the analysis being performed.

One embodiment provides a network-based (e.g., Web-based) implementation. In this embodiment, the user submits the binary code (e.g., the target code, or "Software Under Test") to a remote system. A user, in this embodiment, may be a person, or a computer system. For example, if a web browser on a computer detects that a web page is attempting to run a Flash file, the web browser may send the Flash file to a remote analysis system for processing. The user may also specify certain analysis parameters, which may influence the execution of the method. For example, if a user requests a quick turn-around, the remote analysis system may perform one or more of the optimization techniques described above to accelerate the analysis. Alternately, the user may specify a search depth, etc.

The remote analysis system then returns a result to the user, to indicate the outcome of the analysis. The user may the take action based on that result, such as alerting a person, allowing the target code to execute, guaranteeing the target code, or simply decking to allow the target code to execute.

Figures 4E, 5:
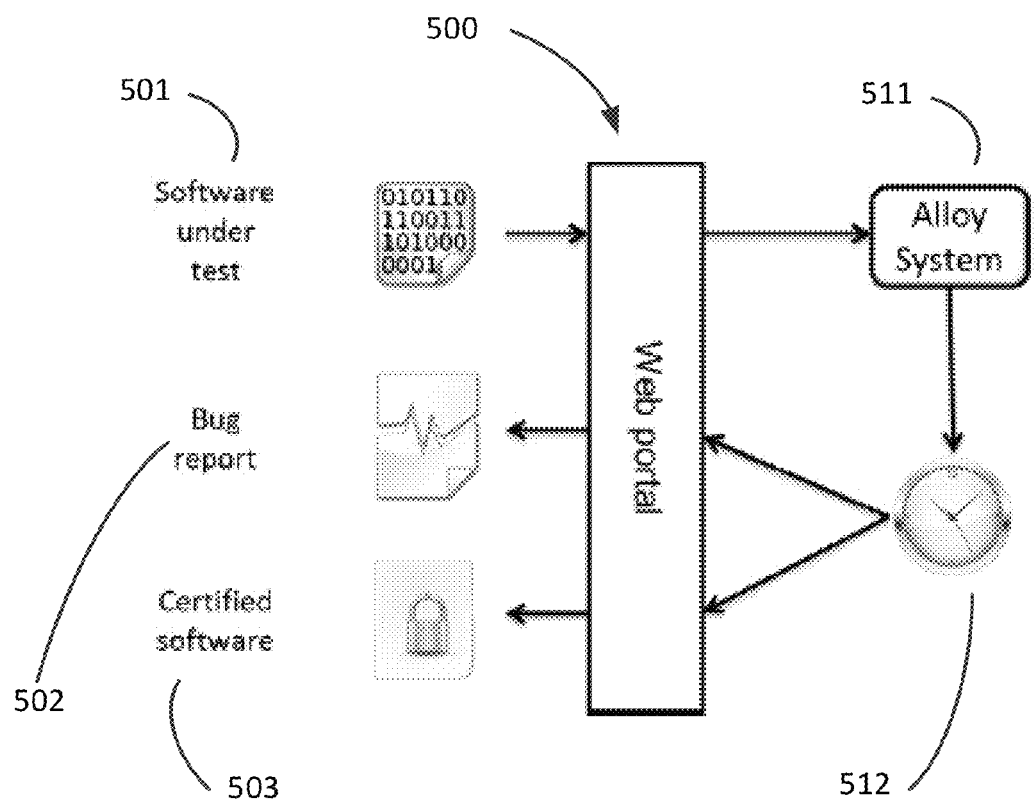
FIG. 4E is a formula for calculating a segmentation metric.
FIG. 5 schematically illustrates a web-based system for inspecting target code.

Taking the Alloy Analyzer as an example, a user submits the target code 501 to an Alloy-based system 511 via a Web Portal 500, as schematically illustrated in FIG. 5. In various embodiments, the user may be an individual person working on a computer, or may be an item of software (e.g., a web browser) operating on a remote client computer. The Alloy-based system 511 then performs its processing (represented by clock 512) as a back-end to the Web Portal 500. Such processing, for example, could be implemented using commodity cloud-based computing instances to perform the analysis. The output of the Alloy Analyzer 511 is returned to the user via the web portal 500, and could be a bug report 501, which could include information about counterexamples (e.g., rule violations) identified in the analysis, or a software certification 503 as described below. Alternately, the output could be text-based message as described above.

Since the security rules stated in the static model are essentially orthogonal to one another (that is, the rules are independent of one another, and therefore could be analyzed separately), it would be possible to partition the rules over more than one compute instance. In the extreme case, some embodiments include a compute instance per rule in order to achieve maximum parallelism.

In this embodiment, the Web Portal software can also imposed a tiered service/tiered pricing model, such that more in depth analysis (with greater search depth and more parallelism) can be obtained by specifying a higher tier of service. If any of the compute instances discovers a counterexample, then all subsequent analysis may be terminated, and a detailed report of the counterexample is produced and delivered to the user. In the case that all compute instances run to completion and no counterexample is found, the Web Portal software may digitally sign the target code (Software Under Test) using stand strong cryptographic operations to insure that the resulting signature would be difficult to forge. Any subsequent user can then inspect the software, observe and verify the digital signature, and thus gain confidence that the target code was shown to obey all the rules in its security specification.

Figure 6:
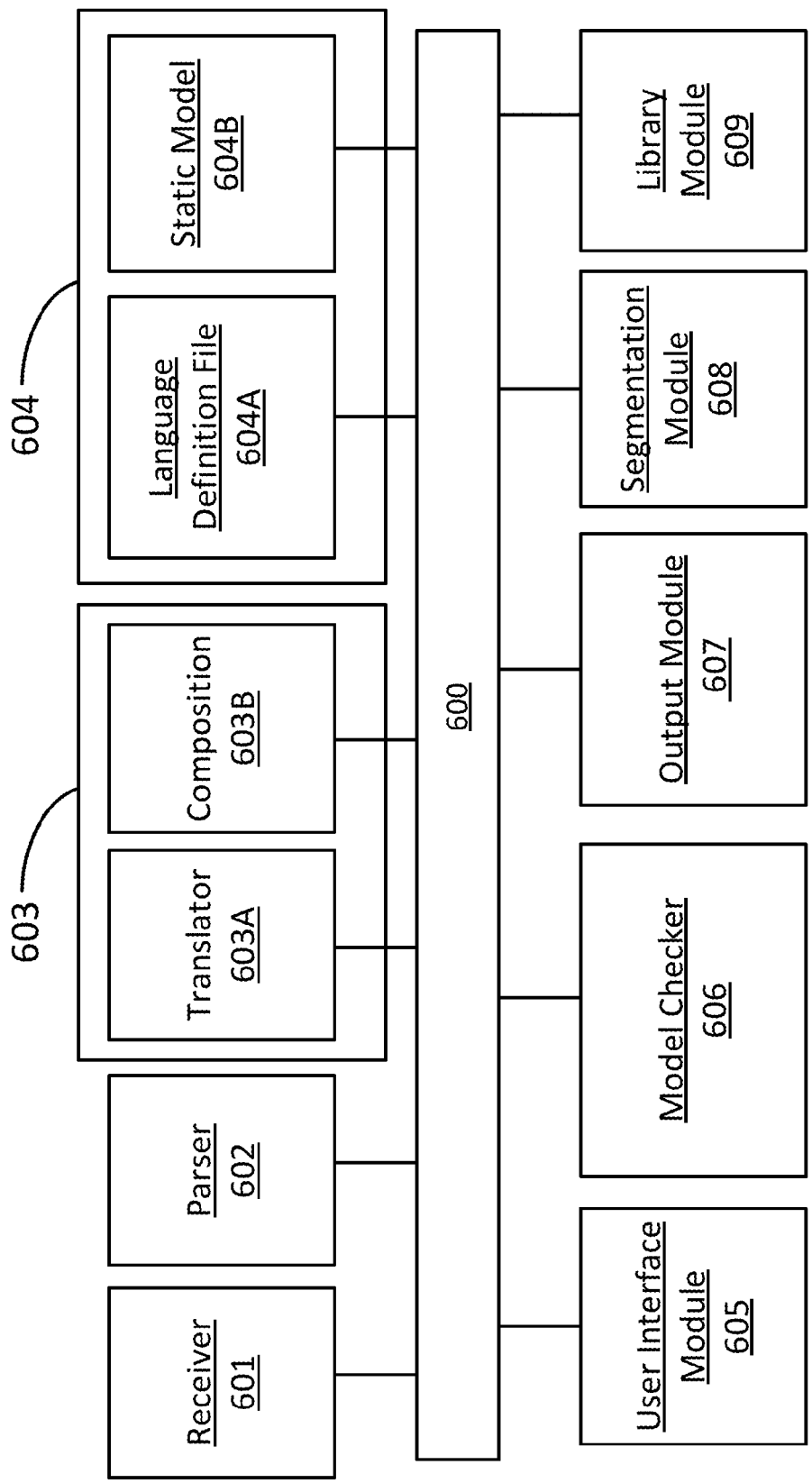
FIG. 6 schematically illustrates a system for inspecting target code.

Although various embodiments have been described above in terms of a method or a web portal system, other embodiments may be described. For example, some or all of the method steps may be implemented in software, for execution on computer hardware. In some embodiments, such software may be provided in a tangible medium, such as a non-transient computer readable medium. Other embodiments may be described in terms of a system, for example as schematically illustrated in FIG. 6.

A system 600 includes a variety of interconnected modules. For example, some systems include a receiving module 601 for receiving the target code to be analyzed. Illustrative system 600 also includes a parser module 602 for parsing an input item of binary code (target code) and producing a data structure as described above.

The system 600 also includes a metadata module 604 (or language metadata module), such as a means of storing (e.g., memory), obtaining or receiving (e.g., a communications interface) metadata for use in the analysis of target code. The metadata module 604 may also be described as including a language definition file 604A, or means (e.g., software) of storing (e.g., memory), obtaining or receiving (e.g., a communications interface) a language definition file.

The metadata module 604 may also be described as including a static model 604B, or means of storing (e.g., memory), obtaining or receiving (e.g., a communications interface) a static model 604B.

The system 600 also includes a composite module 603, configured to create a composite model. In some embodiments, the composite module 603 includes a translator module 603A for creating a dynamic model from the data structure and the language definition file, and a composition module 603B for creating the composite model from the dynamic model and the static model. In other words, in some embodiments, the system's translator module 603A may first create the dynamic model, and then the system's composition module 603B creates the composite model from the dynamic model and the static model. In alternate embodiments, the composite module 603 may be a single module that creates a composite model from the data structure (i.e., the parsed code), the language definition file and the static model without first creating a dynamic model.

An optional User Interface Module 605 may receive user input (e.g., various parameters) as described above, and/or provide output as described above. A model checker module 606 performs the model checker analysis as described above. An Output Module 607 may receive the output of the model checker module 606 and format the output into a form usable or desirable by a user.

Some embodiments may include a segmentation module 608 for segmenting the composite model as described above. Also, some embodiments may include a library module 609 for storing items of previously-analyzed code.

In short, the system 600, and the various modules 601-609 of the system 600, may implement some or all of the methods described above.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

INCORPORATED APPENDICES

The following appendices form an integral part of this application and are fully incorporated herein:

Appendix A: Example Language Definition File for Java language;

Appendix B: Example Dynamic Model of example Java code;

Appendix C: Example Static Model for Java language;

Appendix D: Example Composite Model for example Java code;

Appendix E: 2012 Thesis of Mark Reynolds, Ph.D.

What is claimed is:

1. A method of scanning an item of executable binary code prepared from a program written in a programming language, the method employing a model checker and executing on a host computer processor, the method comprising:

preparing a data structure corresponding to the item of executable binary code, the data structure comprising executable elements parsed from the item of executable binary code;

creating a composite model of the executable binary code by supplementing the data structure with metadata comprising at least security rules defined by a specification of the programming language and rules defining the format of instructions in the programming language, the composite model having a format for processing by the model checker;

segmenting the composite model into a plurality of segments, segmenting comprising the steps of:

dividing the composite model into a plurality of initial, consecutive segments, including at least a first segment; and changing a distribution of instructions among the segments by, for each segment after the first segment, assessing at least the first instruction in each segment, and moving the at least first instruction to an immediately preceding segment if that at least first instruction is not a transfer instruction;

analyzing each of the plurality of segments individually, and analyzing boundaries of the segments, with the model checker to assess whether the executable binary code violates a rule defined by the programming language; and generating an output based on a result produced by the model checker, the output including an indication of whether the binary code possibly contains malware.

2. The method of claim 1, wherein creating a composite model, comprises:

providing a language definition file comprising metadata having the rules defining the format of instructions in the programming language;

providing a static model comprising metadata comprising rules defined from the security specification of the programming language;

creating a dynamic model from the data structure by supplementing the data structure with information from the language definition file, the dynamic model having a format for processing by a model checking system; and supplementing the dynamic model with information from the static model.

3. The method of scanning an item of executable binary code according to claim 1, wherein the model checker comprises a proof system.

4. The method of scanning an item of executable binary code according to claim 2, wherein the model checker comprises Alloy Analyzer.

5. The method of scanning an item of executable binary code according to claim 1, wherein the model checker comprises a constraint-based model checker.

6. The method of scanning an item of executable binary code according to claim 1, wherein the model checker comprises Isabelle.

7. The method of scanning an item of executable binary code according to claim 1, wherein analyzing each of the plurality of segments individually comprises analyzing each of the segments in parallel using a plurality of model checking systems.

8. The method of scanning an item of executable binary code according to claim 1, wherein segmenting the composite model into a plurality of segments comprises:

providing a tuning factor length, the tuning factor length representing a number of instructions in a segment; and wherein dividing the composite model into a plurality of initial, consecutive segments, including at least a first segment, comprises dividing the composite models into segments, each segment having a length not greater than the tuning factor length; and wherein changing a distribution of instructions among the segments comprises moving the at least first instruction to an immediately preceding segment if moving the at least first instruction would not cause the length of the immediately preceding segment to exceed the tuning factor length.

9. The method of scanning an item of executable binary code according to claim 1, wherein:

segmenting the composite model into a plurality of segments comprises segmenting the composite model by language rule, and wherein analyzing each of the plurality of segments individually comprises analyzing each of the segments in parallel using a plurality of model checking systems.

10. A non-transient computer program product comprising computer code for execution on a host computer processor, the computer code for implementing a method of scanning an item of target code prepared from a program written in a programming language having a security specification, the method employing a model checking system, the code comprising:

computer code for receiving the item of target code, the target code comprising an item of executable binary code;

code for preparing a data structure corresponding to the item target code by parsing the target code to extract executable elements;

code for providing a language definition file corresponding to the programming language, the language definition file comprising rules defining the format of instructions in the programming language;

code for providing a static model corresponding to the programming language, the static model comprising rules defined from the security specification of the programming language;

code for creating a composite model of the target code by supplementing the data structure with information from the language definition file, and with information from the static model, the composite model having a format for processing by the model checking system;

code for segmenting the composite model into a plurality of segments including at least a first segment; and code for changing a distribution of instructions among the segments by, for each segment after the first segment, assessing at least the first instruction in each segment, and moving the at least first instruction to an immediately preceding segment if that at least first instruction is not a transfer instruction;

code for providing the composite model to the model checker;

code for engaging the model checker to analyze the composite model, the code for engaging the model checker comprising:

code for analyzing each of the plurality of segments individually; and code for analyzing boundaries of the segments;

the model checker producing a result; and code for generating an output based on the result produced by the model checker, the output indicating a measure of whether the model checker identified an indication that the target contains malware.

11. The non-transient computer program product according to claim 10, wherein code for segmenting the composite model into a plurality of segments comprises:

code for providing a tuning factor length, the tuning factor length representing a number of instructions in a segment; and wherein code for dividing the composite model into a plurality of initial, consecutive segments, including at least a first segment, comprises code for dividing the composite model into a plurality of segments, each segment having a length not greater than the tuning factor length; and wherein code for changing a distribution of instructions among the segments comprises code for moving the at least first instruction to an immediately preceding segment if moving the at least first instruction would not cause the length of the immediately preceding segment to exceed the tuning factor length.

12. The non-transient computer program product according to claim 10, wherein code for segmenting the composite model into a plurality of segments comprises:

code for segmenting the composite model into a plurality of segments according to language rule, and wherein code for providing the composite model to the model checker comprises code for providing the plurality of segments to a plurality of model checking systems.

13. The non-transient computer program product according to claim 10, wherein the code for analyzing each of the plurality of segments individually comprises code for analyzing each of the segments in parallel using a plurality of model checking systems.

14. A system for scanning an item of executable binary code prepared from a program written in a programming language having a security specification, the method employing a model checker and executing on a host computer processor, the system comprising:

a receiving module for receiving an item of executable binary code;

a parsing module for preparing a data structure corresponding to the item of executable binary code by parsing the executable binary code to extract executable elements;

a language metadata module for providing a language definition file corresponding to the programming language, the language definition file comprising rules defining the format of instructions in the programming language, and for providing a static model corresponding to the programming language, the static model comprising rules defined from the security specification of the programming language;

a composite module for creating a composite model of the executable binary code by supplementing the data structure with information from the language definition file, and with information from the static model, the composite model having a format for processing by a model checker;

a segmentation module for segmenting the composite model into a plurality of segments, the segmentation module configured to:

divide the composite model into a plurality of initial, consecutive segments, including at least a first segment; and change a distribution of instructions among the segments by, for each segment after the first segment, assessing at least the first instruction in each segment, and moving the at least first instruction to an immediately preceding segment if that at least first instruction is not a transfer instruction; and a model checker configured to analyze each of the plurality of segments, and to analyze boundaries of the segments, of the composite model according to the rules defining the format of instructions in the programming language, and/or the rules defined from the security specification of the programming language, and to produce a result, the result comprising an indication that the binary code contains malware.

15. The system for scanning an item of executable binary code according to claim 14, wherein the model checker comprises a plurality of model checkers for individually analyzing the plurality of segments.

16. The system for scanning an item of executable binary code according to claim 14, further comprising a library module, the library module for storing a plurality of previously analyzed segments, and wherein the model checker is configured to access one or more of the previously analyzed segments instead of performing a new analysis of a one of the plurality of segments.

17. The system for scanning an item of executable binary code according to claim 14, wherein the segmentation module is configured to:
- divide the composite model into a plurality of initial, consecutive segments, including at least a first segment, each segment having a length not greater than a tuning factor length; and
- change a distribution of instructions among the segments by moving the at least first instruction to an immediately preceding segment if moving the at least first instruction would not cause the length of the immediately preceding segment to exceed the tuning factor length.

* * * * *